Patented Mar. 2, 1943

2,312,918

UNITED STATES PATENT OFFICE 2,312,918

METHOD OF PRODUCING BUNSEN'S SALT

Urner Liddel, Greenwich, and Robert B. Barnes, Stamford, Conn., assignors to American Cyanamid Company, New York, N. Y., a corporation of Maine No Drawing. Application July 10, 1940, Serial No. 344,700

8 Claims. (Cl. 23—77)

The present invention relates to a method of preparing Bunsen's salt, to wit: tetra ammonium ferrocyanide, with two molecules of ammonium chloride of crystallization.

The usual method of the prior art is by reaction between a solution of ferrocyanic acid or a salt thereof and a solution of ammonium chloride. Recovery of Bunsen's salt from such a reaction mixture is difficult, first, by reason of the dilution thereof and second, because once in solution with ammonium chloride, it is difficult to separate the two to obtain a product of desired purity.

The principal object of the present invention, therefore, is to prepare Bunsen's salt in solid form of good purity without the necessity of extensive water removal and by a simple method.

It has been discovered that the above objects may be accomplished if solid ammonium chloride is added to a saturated aqueous solution of an alkali or alkaline earth metal (hereinafter referred to as an alkali-forming metal) ferrocyanide, while maintaining the temperature of the reaction mixture no lower than that at which the solution was originally saturated with the ferrocyanide. Under these circumstances, Bunsen's salt precipitates immediately and almost quantitatively. The mixture should be filtered while at that temperature and without cooling in order to avoid excessive contamination with ammonium chloride. Recrystallization of the thus obtained crude Bunsen's salt recovers the latter in a state of exceptional purity and particularly free from undesirable quantities of ammonium chloride.

It is preferable to start with a saturated solution of sodium ferrocyanide. Ordinarily 8 mols of ammonium chloride are required per mol of sodium ferrocyanide. However, under these circumstances, the yield is low so that best results are obtained when 9 or 10 mols of the former are used per mol of the latter. 9 mols gives optimum results. If more than 10 mols is added, the precipitate is badly contaminated with ammonium chloride which is most difficult to remove.

It has been found important in producing solid Bunsen's salt of good purity to maintain the temperature at which the solution is saturated with the alkali-forming metal ferrocyanide. When solid ammonium chloride is added thereto, its negative heat of solution has a tendency to lower the temperature. Consequently, heat should be supplied at a rate preferably no faster than heat is abstracted through ammonium chloride solution. A slight increase in temperature is not detrimental but a drop in temperature is definitely to be avoided. If the latter condition is disregarded, the product is contaminated with free ammonium chloride.

For example, a saturated solution of sodium ferrocyanide was made at about 45° C. Any other temperature below the decomposition point of the ferrocyanide is also suitable, although temperatures from 30 to 55° C. are preferred as this range gives the best yields. 9 mols of solid ammonium chloride were then added slowly with stirring while supplying heat to the reaction mixture so as to maintain the temperature thereof at substantially 45° C. or slightly above. Bunsen's salt immediately is precipitated as pale yellow crystals which may be filtered from the liquid and air dried. These crude crystals are remarkably free from contaminating sodium salts and excess ammonium chloride.

By crystallizing the crude salt from water, contaminating impurities may be reduced to a minimum.

Bunsen's salt finds extensive usefulness in the photographic art as it exhibits considerable instability in the presence of light. In the pure state, however, it may be kept in subdued light for a considerable length of time.

While the invention has been described with particular reference to specific embodiments, it is to be understood that it is not to be limited thereto but is to be construed broadly and restricted solely by the scope of the appended claims.

We claim:

1. A method of preparing $$(NH_4)_4Fe(CN)_6 \cdot 2NH_4Cl$$

which includes the steps of adding solid ammonium chloride to a saturated solution of an alkali-forming metal ferrocyanide while maintaining the temperature of the reaction magma no less than that at which the solution was originally saturated with ferrocyanide.

2. The method of claim 1 in which the ferrocyanide is of sodium.

3. The method of claim 1 in which from 8 to 10 mols of ammonium chloride per mol of ferrocyanide is added.

4. A method of preparing $$(NH_4)_4Fe(CN)_6 \cdot 2NH_4Cl$$

which includes the steps of adding 8 to 10 mols of solid ammonium chloride to a saturated solution of sodium ferrocyanide and supplying heat to the reacting mixture at a rate sufficient to counteract the negative heat of solution of the ammonium chloride.

5. A method of preparing $(NH_4)_4Fe(CN)_6 \cdot 2NH_4Cl$ which includes the steps of adding 8 to 10 mols of solid ammonium chloride to a solution of sodium ferrocyanide saturated within the range of from 30 to 55° C. and supplying heat to the reacting mixture at a rate sufficient to counteract the negative heat of solution of the ammonium chloride.

6. A method of preparing $(NH_4)_4Fe(CN)_6 \cdot 2NH_4Cl$ which includes the steps of adding 9 mols of solid ammonium chloride to a solution of sodium ferrocyanide saturated at substantially 45° C., while supplying heat to prevent a temperature drop below 45° C.

7. The method of claim 6 with the additional steps of filtering the thus formed Bunsen's salt and air drying the same.

8. The method of claim 6 with the additional step of filtering the thus formed Bunsen's salt, recrystallizing the same from water, and air drying.

URNER LIDDEL.
ROBERT B. BARNES.